O. D. McFARLAND.
METHOD OF MAKING SHINGLE SIMULATING ROOFING STRIPS.
APPLICATION FILED APR. 16, 1919.
Reissued Nov. 14, 1922. 15,489.
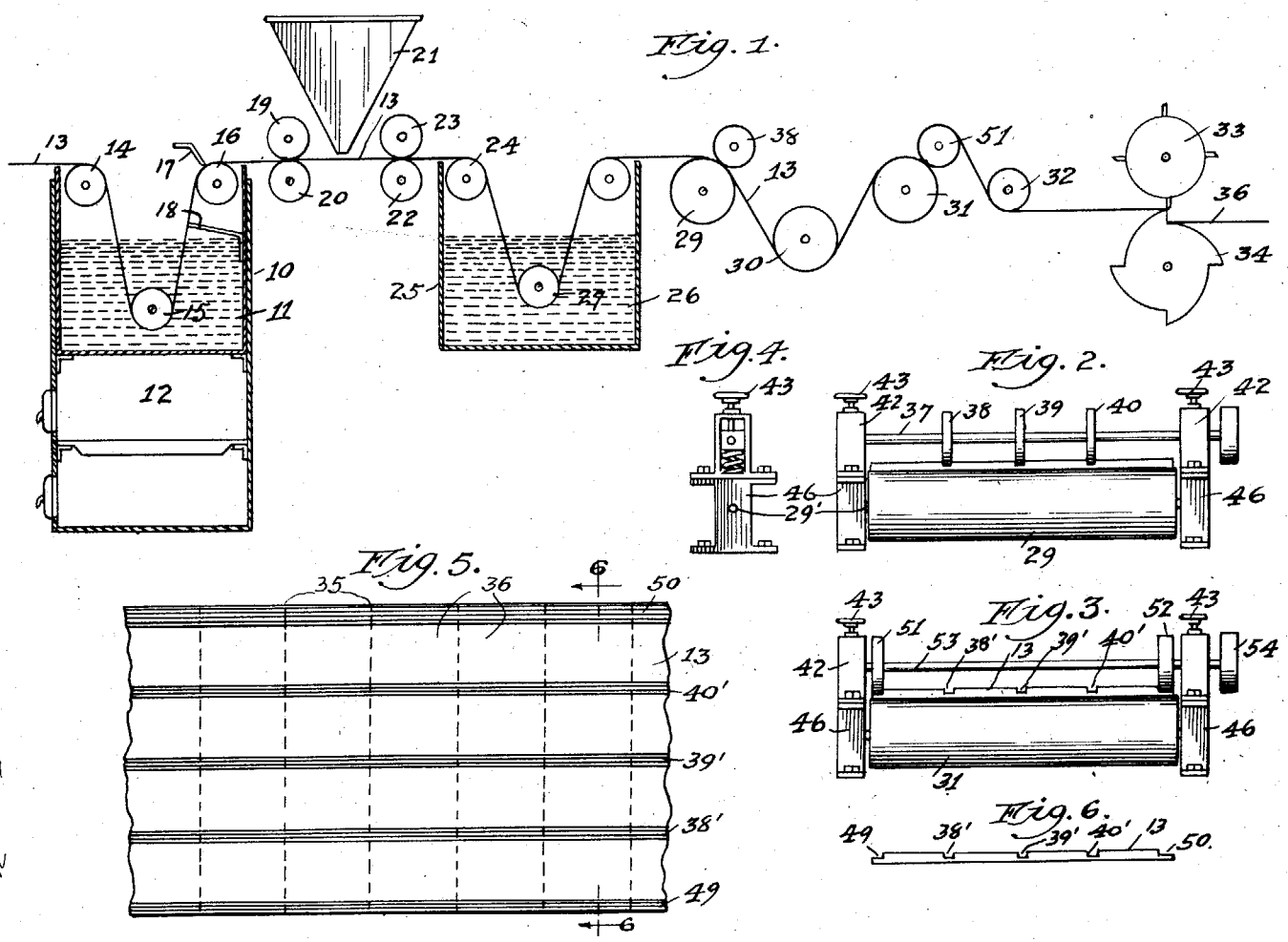
Witness,
Inventor,
Owen D. McFarland
By Frank L. Belknap
Atty.

Reissued Nov. 14, 1922. Re. 15,489

UNITED STATES PATENT OFFICE.

OWEN D. McFARLAND, OF CHICAGO, ILLINOIS.

METHOD OF MAKING SHINGLE-SIMULATING ROOFING STRIPS.

Original No. 1,296,984, dated March 11, 1919, Serial No. 200,856, filed November 8, 1917. Application for reissue filed April 16, 1919. Serial No. 290,595.

*To all whom it may concern:*

Be it known that I, OWEN D. McFARLAND, a citizen of the United States, residing at Chicago, in the county of Cook and State of Illinois, have invented certain new and useful Improvements in Methods of Making Shingle-Simulating Roofing Strips, of which the following is a specification.

The invention relates to improvements in methods of making shingle-simulating roofing strips.

One of the objects of my invention is to provide a new method of making shingle-simulating strips, of ordinary asphaltic roofing material, whereby to cheapen the cost of production and to improve the artistic appearance of the finished strip.

Other and further objects of my invention will become readily apparent, to persons skilled in art, from a consideration of the following description when taken in conjunction with the drawings, wherein:—

Figure 1 is a schematic representation, in elevation of a continuous sheet of felt, or other like base, undergoing the process of being made into shingle-simulating strips.

Fig. 2 is a transversely extending shaft showing a plurality of disks mounted thereon for removing the comminuted mineral material to expose the asphalt therebelow in longitudinally extending stripes.

Fig. 3 is a similar view showing disks for making the end stripes which are cut deeper into the sheet and are separately adjustable.

Fig. 4 is an end view of one of the shaft bearings showing the manner of adjusting the disks toward and from the sheet.

Fig. 5 is a plan view of the sheet, showing the longitudinally extending stripes and in dotted lines, the planes through which the sheet is to be cut to form the strips.

Fig. 6 is a section taken on line 6—6 of Fig. 5.

In all the views the same reference characters are employed to indicate some of the parts.

I do not claim to be the first to produce a shingle simulating strip by covering a sheet of asphaltic roofing with a uniform coating of slate, or other mineral or material, and providing stripes at intervals, extending transversely of the sheets in series, and linearly in a longitudinal direction of the sheet, to expose the asphalt therebelow and subsequently cutting the sheet transversely to form the strips. My invention relates to the particular method of producing the article.

Heretofore strips of this character have been made by covering certain portions of the asphaltic sheet, as by strips of paper or the like, prior to the application of the slate, or other coating, and subsequently removing the paper to expose the asphalt. In other instances, certain portions of the sheet have been covered with sand or like granular material, before the application of the slate coating, and subsequently the sand has been embedded into the asphalt therebelow to produce the contrasting stripes between the areas coated with the slate. The stripes in the sheet, as heretofore produced by the method referred to, are of indistinct outline and are not as strongly contrastable with the slate coated area to produce the best effect and furthermore the older methods pursued as heretofore described, are expensive and for this reason undesirable.

In carrying my invention into effect, I pass the sheet of felt, or other suitable base, through a receptacle, such as 10 containing hot asphalt 11, which is heated by the furnace 12, therebelow. The sheet 13 passes over a roller 14 into the tank 10 and around a roller 15 and over the roller 16. The doctors 17 and 18 remove the excessive quantity of asphalt from the sheet as it emerges from the tank 10. The sheet is then passed between the driving rollers 19 and 20 and under the hopper 21 containing slate, or other like granular material, which is deposited upon the top surface of the sheet. The sheet, then coated with slate throughout its entire extent passes over the roller 24 into a tank 25 containing water 26. The water is circulated through the tank by suitable means, to maintain a uniform temperature and to carry away the heat coming from the sheet. The sheet passes under a suspended roller 27, within the tank, and over another roller 28, at the top of the tank. It is then passed over the roller 29, under the roller 30 and over the roller 31, and again under the roller 32, in front of the rotatable knives 33 and 34, which serve to cut the sheet transversely as on the lines 35, shown in Fig. 5, to provide the shingle simulating strips 36.

A shaft 37 extended transversely of the sheet and is provided with disks 38, 39 and 40. These disks are of metal and have smooth faces, they may be either of steel or copper and when rotated rapidly in contact with the upper surface of the sheet they very effectively and thoroughly remove those portions of the slate coating with which they come in contact, leaving clearly defined outlines on each side, of the stripes 38′, 39′ and 40′, which are parallel and extend longitudinally of the moving sheet. The ends of the shaft 37 are supported in boxes or bearing blocks 41, and vertically adjustable in the standard 42, by means of screws 43, and springs 44. By rotating the screws 43, at each end of the shaft 37, the relative height of the respective ends of the shaft may be adjusted so as to bring the disks 38, 39 and 40 more intimately into contact with the underlying sheet. A pulley 45 is secured to the outer end of the shaft 37 and affords a means of rotating the disks. The standards 42 may be supported upon pillars 46 within which the shaft 29′ carrying the roller 29, find bearing support.

The stripes 49 and 50 at the margin edges of the sheet are somewhat deeper than the stripes 38′ to 40′ inclusive. I therefore mount the disks 51 and 52 on a separably adjustable shaft 53, which finds bearings in the standards 42 and is supported and adjusted in the same manner as the shaft 37, being provided with a driving pulley 54 secured to its outer end. The stripe 50 is also somewhat wider than the other stripes, so as to provide sufficient room for a lap for the adjoining strip. I prefer to make the base portion, upon which the stripes 49 and 50 are made, somewhat thinner than the base portions underlying the stripes 38′ to 40′ inclusive, so that the interlap of the stripes will not become so clearly apparent.

It will be observed that the sheet 13 is stretched tightly and smoothly over the roll 29 which confronts the disks 38 to 40 inclusive, so that there are no wrinkles or uneven surfaces presented to the disks, to facilitate the operation of the disks and to maintain the stripes at uniform distances apart and of uniform width. The sheet in like manner, is stretched over the roll 31 confronting the disks 51 and 52.

Having described my invention, what I claim as new and desire to secure by Letters Patent is:—

1. The method of making shingle simulating strips which consists in covering a long sheet with an asphaltic material, continuously coating the entire surface of said sheet with a layer of granular or flaky mineral to provide a substantially contrasting color to said asphaltic material, continuously removing part of said mineral material to expose the contrasting asphaltic material therebelow in a plurality of continuous and unbroken stripes, longitudinally disposed on said sheet, continuously moving said sheet while the mineral is applied and removed, and cutting said sheet transversely across said stripes into strips in imitation of shingles.

2. The method of making shingle-simulating strips which consists in covering a relatively long narrow sheet with hot asphaltic material; coating the entire surface of said sheet with a layer of granular or flaky material of substantially uniform color, passing said sheet under rapidly rotating disks to remove the mineral material thereby exposing the contrasting asphalt therebelow in parallel stripes, continuously moving said sheet and cutting said sheet transversely across said stripes into strips in imitation of shingles.

3. The method of making shingle simulating strips which consists in covering a long sheet with hot asphaltic material, coating the entire surface of said sheet with a layer of granular or flaky material, continuously removing part of said mineral material to expose the contrasting asphaltic material therebelow in a plurality of continuous and unbroken stripes longitudinally disposed on said sheets, the stripes being located intermediate the edges of the sheets and also at the edges of the sheets, the material being removed to a greater depth at the edges of the sheet than for the intermediate stripes, and cutting said sheets transversely across said stripes into strips in imitation of shingles.

4. A shingle simulating strip comprising a backing having a layer of asphaltic material with one of its faces covered in continuous zones with granular or flaky material to give it color, said zones being divided by continuous transversely extending stripes exposing the asphaltic material below the flaky material and said strip having continuous marginal end stripes, one of said end stripes being of substantially the same width as said transverse stripes, the other end stripe being much wider than the other stripes to afford an overlap, the base portion underlying the marginal stripes being thinner than that under the zone dividing stripes.

5. A method of making roofing elements consisting in covering a sheet with an adhesive coating, applying a layer of granular material over said coating of a different color than said coating, continuously removing part of said granular material in a plurality of strips to expose the contrasting color of said coating in a plurality of areas on said sheet, continuously moving the sheet while the granular material is being applied and portions thereof removed.

6. A method of making roofing elements consisting in covering a sheet with an adhesive coating, applying a layer of granular material over said coating of a different color than said coating, continuously removing part of said granular material in a plurality of strips to expose the contrasting color of said coating in a plurality of areas on said sheet, continuously moving the sheet while the granular material is being applied and portions thereof removed and cutting said sheet transversely into strips.

7. A method of making roofing elements which consists in covering a sheet with hot bituminous material, covering the entire surface of said sheet with a layer of granular material of a different color than the bituminous material, passing said sheet under rotating disks to remove the predetermined areas of said granular material in a plurality of strips, thereby exposing the contrasting bituminous material in said areas, continuously moving said sheet, and cutting said sheet transversely across said areas into strips.

8. A method of making shingle simulating strips, which consists in covering a sheet with hot bituminous material, coating the entire surface of said sheet with a layer of granular or flaky material, removing predetermined areas of said granular or flaky material to expose the contrasting bituminous material therebelow in a plurality of stripes longitudinally disposed in said sheet, certain of said stripes being located intermediate the edges of the sheet and finally cutting said sheet transversely across said stripes into shingle strips.

9. The method of making roofing elements which consists in covering a sheet with an adhesive coating, in applying a granular substance thereto of a color different from the coating, in passing said sheet under an element to continuously remove part of the granular material to expose defined areas of the adhesive coating without disturbing other areas having the granular material, in a plurality of continuous strips to present a surface of strikingly different colors.

10. The method of preparing shingle simulating strips, which consists in covering a sheet with an adhesive coating, in applying a granular substance to the adhesive coating to entirely cover the same, and in then removing a portion of the applied granular substance before the adhesive material hardens to expose defined areas of the adhesive material which sharply contrast in appearance to the granular substance.

11. The method of making shingle simulating strips, which comprises coating a sheet with a bituminous adhesive substance, in applying to the entire surface of the coated sheet a granulated material, and in removing portions of the granulated material from the sheet before the adhesive coating sets to define exposed areas of the adhesive coating sharply contrasting in appearance to the granular material.

OWEN D. McFARLAND.